United States Patent [19]

Lenhard-Backhaus

[11] Patent Number: 4,600,068

[45] Date of Patent: Jul. 15, 1986

[54] VEHICLE

[75] Inventor: Hugo Lenhard-Backhaus, Bruck an der Mur, Austria

[73] Assignee: Steyr-Daimler-Puch Aktiengesellschaft, Vienna, Austria

[21] Appl. No.: 755,848

[22] Filed: Jul. 17, 1985

[30] Foreign Application Priority Data

Jul. 30, 1984 [AT] Austria ................................ 2455/84

[51] Int. Cl.$^4$ ............................................ B62D 11/08
[52] U.S. Cl. ...................................... 180/6.44; 180/6.7
[58] Field of Search ....................... 180/6.44, 6.7, 9.1, 180/6.2, 291

[56] References Cited

U.S. PATENT DOCUMENTS

| | | | |
|---|---|---|---|
| 3,520,376 | 7/1970 | Müller | 180/6.7 |
| 3,601,211 | 8/1971 | Finke | 180/6.7 |
| 3,907,052 | 9/1975 | Shaw | 180/6.7 |

Primary Examiner—John A. Pekar
Assistant Examiner—Donn McGiehan
Attorney, Agent, or Firm—Kurt Kelman

[57] ABSTRACT

A driving and steering mechanism of a track-laying vehicle comprises a drive motor, which has a motor shaft that is parallel to and extends beside the vertical longitudinal center plane of the vehicle, a shiftable transmission, which operatively connects said shaft to a power train, which comprises an angle drive and a universal-joint shaft, two planetary spur gear trains for driving respective propelling wheels of the vehicle and adapted to be driven by said power train, and a controllable hydrostatic transmission, which is operatively connected to said drive motor and arranged to rotate two gear members of respective ones of said planetary spur gear trains in mutually opposite senses. The drive motor, the shiftable transmission and the angle drive of the power train are aligned in the axial direction of the motor shaft and are directly connected to each other and adjoin each other, the universal-joint shaft of the power train extends transversely to said direction and is surrounded by a tubular shaft and is non-rotatably connected at one end to the angle drive and at the other end to the tubular shaft, the tubular shaft carries two gears, which mesh with respective gear members of respective ones of said planetary spur gear trains, and the pump of the hydrostatic transmission is directly driven by an auxiliary shaft of the shiftable transmission.

5 Claims, 1 Drawing Figure

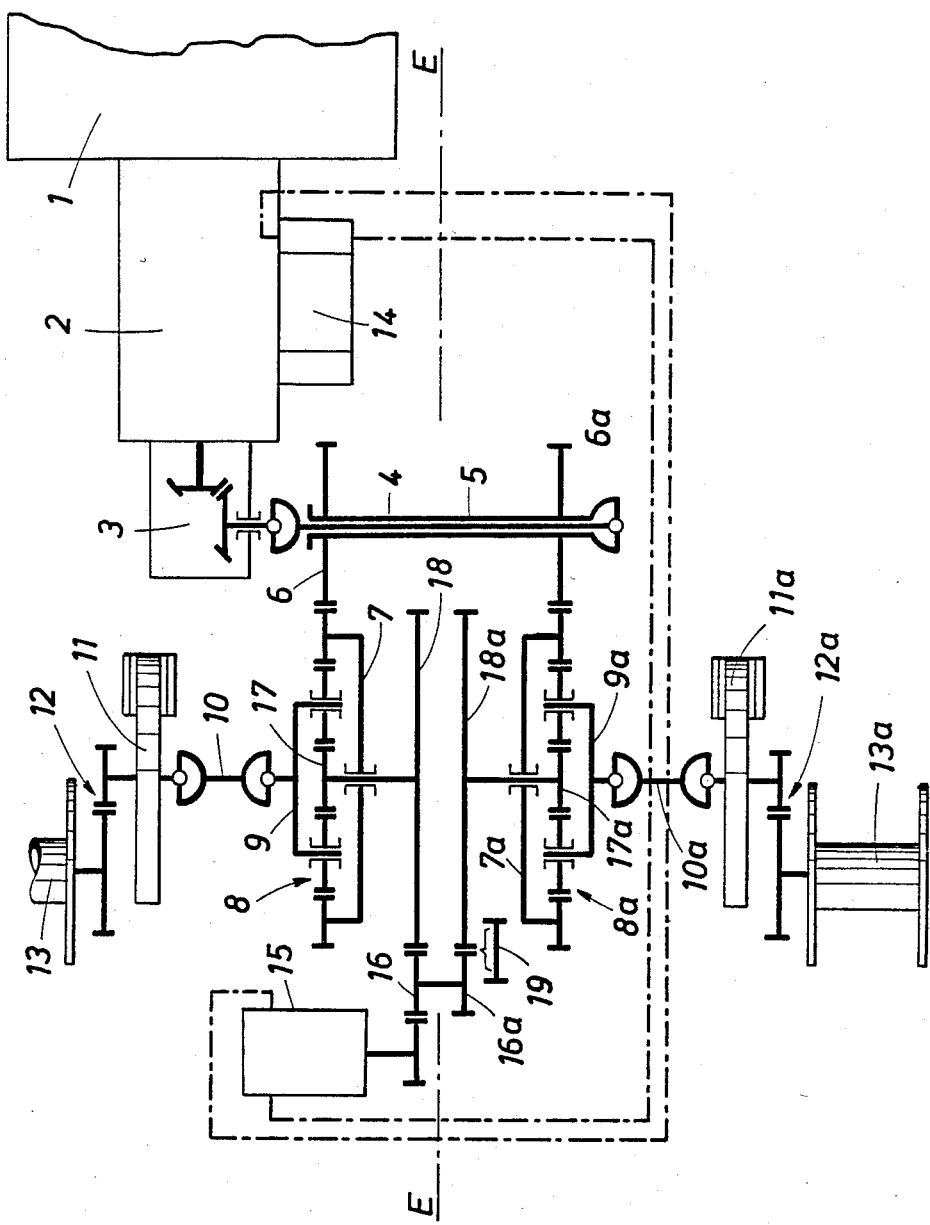

VEHICLE

BACKGROUND OF THE INVENTION

1. Field of the Invention

This invention relates to a vehicle, particularly to a tracklaying vehicle, which comprises a driving and steering mechanism comprising a drive motor, which has a motor shaft that is parallel to and extends beside the vertical longitudinal center plane of the vehicle, a shiftable transmission, which operatively connects said shaft to a power train, which comprises an angle drive and a universal-joint shaft, two planetary spur gear trains for driving respective propelling wheels of the vehicle and adapted to be driven by said power train, and a controllable hydrostatic transmission, which is operatively connected to said drive motor and arranged to rotate two gear members of respective ones of said planetary spur gear trains in mutually opposite senses.

2. Description of the Prior Art

Vehicles provided with such driving and steering mechanisms are already used in practice. In the known mechanisms, the shiftable transmission extends beside the drive motor and is driven via a plurality of spur gears from that end of the motor which is opposite to the propelling wheels. In a direction which is approximately parallel to the motor shaft, the power train extends from the output shaft of that shiftable transmission to the two planetary spur gear trains, which are directly driven by the angle drive, which is connected to the shiftable transmission by the universal-joint shaft. The pump of the hydrostatic transmission is driven by the drive motor from that end thereof which faces the propelling wheels, also via a universal-joint shaft and an intermediate transmission. The controllable hydrostatic transmission rotates two gear members of respective ones of the planetary spur gear trains in mutually opposite senses and is used to steer the vehicle because the two propelling wheels are rotated at different speeds as one gear member of each planetary spur gear train is driven in a sense that is opposite to the sense of rotation of the corresponding gear member of the other planetary spur gear train whereas the other gear members of the planetary spur gear trains are driven by the drive motor via the power train in the same sense. As a result, the track chain provided on one side of the vehicle leads or lags the track chain provided on the other side of the vehicle.

In the known arrangement, in which the shiftable transmission extends beside the drive motor and is connected to the latter by spur gears, the mechanism has approximately the shape of a U, which can be mounted only with difficulty and which is undesirable from a static aspect. For this reason a heavy and relatively rigid structure is required. The spur gears for transmitting power from the motor to the shiftable transmission increase the structural expenditure, which is increased further by the universal-joint shaft and the intermediate transmission used to drive the pump of the hydrostatic transmission, particularly because a relatively high power is required for that pump. It will be understood that the large number of idler wheels which are required will adversely affect the efficiency of the entire mechanism and will contribute to the temperature rise of the lubricating oil, so that a larger oil cooler or an additional oil cooler is required. A further disadvantage resides in that the universal-joint shaft of the power train and the shafts which drive said universal-joint shaft and are driven by it are in most cases not axially aligned but extend at certain angles to each other so that transverse forces are exerted, which must be taken up by the structure provided to mount the motor-transmission unit.

SUMMARY OF THE INVENTION

For this reason it is an object of the invention to eliminate the disadvantages pointed out hereinbefore and to provide a vehicle with a driving and steering mechanism which is of the kind described hereinbefore and which in comparison to the known arrangements of that kind involves a lower structural expenditure, permits a transmission of torque with a higher efficiency, and can be accommodated in a smaller space.

This object is accomplished in accordance with the invention in that the drive motor, the shiftable transmission and the angle drive of the power train are aligned in the axial direction of the motor shaft and are directly connected to each other and adjoin each other, the universal-joint shaft of the power train extends transversely to said direction and is surrounded by a tubular shaft and is non-rotatably connected at one end to the angle drive and at the other end to the tubular shaft, the tubular shaft carries two gears, which mesh with respective gear members of respective ones of said planetary spur gear trains, and the pump of the hydrostatic transmission is directly driven by an auxiliary shaft of the shiftable transmission.

Because the drive motor, the shiftable transmission and the angle drive of the power train are directly connected to each other, there is no longer a need for spur gears for transmitting torque from the motor shaft to the input of the shiftable transmission so that the structural expenditure is reduced. The structural expenditure is further reduced because the intermediate transmission for driving the pump of the hydrostatic transmission is no longer required as the hydrostatic transmission is directly driven by the shiftable transmission. As a result, a universal-joint shaft for driving the pump is no longer required. Because the shiftable transmission adjoins one end of the drive motor, there is a free space beside the drive motor and a statically desirable structure of the motor-transmission unit is obtained so that that unit may be lighter in weight. In the arrangement in accordance with the invention the angle drive of the power train is close to the planetary spur gear trains. But nevertheless, the universal-joint shaft may have an adequate length, because it extends in the tubular shaft transversely to the axis of the motor shaft. That universal-joint shaft is required because the motor-transmission unit and the other units of the driving mechanism are resiliently suspended independently of each other. Such an arrangement of the universal-joint shaft will not involve an unfavorable exertion of transverse forces on the motor-transmission unit so that the means for resiliently suspending said unit need not meet the stringent requirements which were imposed in the prior art. The fact that the shiftable transmission adjoins one end of the drive motor, which arrangement is conventional in numerous vehicles in which the drive motor is centrally disposed, will obviously permit the use of an automatic shiftable transmission. In the known arrangements it was not possible to use an automatic shiftable transmission because the shiftable transmission was disposed beside the motor so that the space required for an automatic transmission was not available.

BRIEF DESCRIPTION OF THE DRAWING

The drawing shows diagrammatically and by way of example a tracklaying vehicle provided with a driving and steering mechanism which embodies the invention.

DETAILED DESCRIPTION OF THE PREFERRED EMBODIMENT

The axis of the motor shaft of the drive motor 1 is laterally spaced from the vertical longitudinal center plane E of the vehicle and is parallel to said plane E. The drive motor 1 is adjoined at its rear end by a shiftable transmission 2 and the latter is adjoined by an angle drive 3, which together with a universal-joint shaft 4 constitutes a power train. It is apparent that the universal-joint shaft 4 of the power train 3, 4 extends transversely to the axis of the motor shaft and to the vertical longitudinal center plane E of the vehicle and is surrounded by a tubular shaft 5. The universal-joint shaft 4 is connected at one end to the angle drive 3 and at the other end to the tubular shaft 5. The tubular shaft 5 is non-rotatably connected to two gears 6, 6a, which mesh with respective ring gear members 7, 7a of respective planetary spur gear trains 8 and 8a, respectively. From each of the planet-carrying gear members 9 and 9a of said planetary spur gear trains 8, 8a, power is transmitted via a universal-joint shaft 10 or 10a, a brake disc 11 or 11a, and a speed-reducing spur gear train 12 or 12a to a propelling wheel 13 or 13a, which consists of a sprocket for driving one of the track chains of the vehicle. The propelling wheels 13 and 13a are disposed on opposite sides of the center plane E.

The vehicle can be steered in that one of the two propelling wheels 13, 13a is retarded and the other is accelerated. This is accomplished by a controllable hydrostatic transmission, which consists of a pump 14 that is directly driven by an auxiliary shaft of the shiftable transmission 2 and supplies hydraulic liquid to a rotary hydraulic motor 15. The latter drives two gears 16 and 16a. The gear 16 is in mesh with a spur gear 18, which is non-rotatably connected to the sun gear member 17 of the planetary spur gear train 8. An idler gear 19 is in mesh withb the gear 16a and the spur gear 18a, which is non-rotatably connected to the sun gear member 17a of the planetary spur gear train 8a. As a result, the sun gear members 17 and 17a of the planetary spur gear trains 8, 8a are driven in mutually opposite senses by the rotary hydraulic motor 15.

I claim:

1. In a vehicle having a vertical longitudinal center plane and comprising
    two propelling wheels disposed on opposite sides of said center plane and
    a driving and steering mechanism including
    a drive motor having a motor shaft which is parallel to and laterally spaced from said center plane,
    a power train including an angle drive and a universal-joint shaft,
    a shiftable transmission for transmitting torque from said motor to said power train,
    two planetary spur gear trains for transmitting torque from said power train to respective ones of said propelling wheels, each of said planetary gear trains comprising three gear members, and
    a controllable hydrostatic transmission including a rotary hydraulic motor connected to a first of said gear members of each of said planetary spur gear trains and operable to rotate said first gear members in mutually opposite senses, and a pump adapted to be driven by said drive motor and to operate said rotary hydraulic motor,
    said shiftable transmission and said angle drive are axially aligned with said motor shaft,
    said shiftable transmission is directly connected to said motor shaft and to said angle drive,
    said universal-joint shaft extends transversely to said motor shaft and is surrounded by a tubular shaft and is non-rotatably connected at one end to said angle drive and at the other end to said tubular shaft,
    said tubular shaft is non-rotatably connected to two gears, each of which is in mesh with one of said gear members of one of said planetary spur gear trains, and
    said shiftable transmission comprises an auxiliary shaft directly connected to said pump.

2. The improvement set forth in claim 1, wherein said drive motor, said shiftable transmission and said angle drive adjoin each other.

3. The improvement set forth in claim 1 as applied to a tracklaying vehicle in which said propelling wheels consist of chain-driving sprockets.

4. In a driving and steering mechanism for driving and steering a vehicle having a vertical longitudinal center plane and comprising two propelling wheels disposed on opposite sides of said center plane, said driving and steering mechanism including
    a drive motor having a motor shaft,
    a power train including an angle drive and a universal-joint shaft,
    a shiftable transmission for transmitting torque from said motor to said power train,
    two planetary spur gear trains, each of which comprises three gear members, and
    a controllable hydrostatic transmission including a rotary hydraulic motor connected to a first of said gear members of each of said planetary spur gear trains and operable to rotate said first gear members in mutually opposite senses, and a pump adapted to be driven by said drive motor and to operate said rotary hydraulic motor,
    said shiftable transmission and said angle drive are axially aligned with said motor shaft,
    said shiftable transmission is directly connected to said motor shaft and to said angle drive,
    said universal-joint shaft extends transversely to said motor shaft and is surrounded by a tubular shaft and is non-rotatably connected at one end to said angle drive and at the other end to said tubular shaft,
    said tubular shaft is non-rotatably connected to two gears, each of which is in mesh with one of said gear members of one of said planetary spur gear trains, and
    said shiftable transmission comprises an auxiliary shaft directly connected to said pump.

5. The improvement set forth in claim 1, wherein said drive motor, said shiftable transmission and said angle drive adjoin each other.

* * * * *